United States Patent [19]

Jones

[11] 4,403,802
[45] Sep. 13, 1983

[54] TRAILER UNIT

[76] Inventor: Russell P. Jones, 6958 Bradshaw, Sacramento, Calif. 95826

[21] Appl. No.: 148,941

[22] Filed: May 12, 1980

[51] Int. Cl.³ .......................... B62D 25/20; B60P 3/32
[52] U.S. Cl. ........................................ 296/25; 49/477; 280/403; 296/168
[58] Field of Search ................... 296/25, 27, 156, 166, 296/168, 171, 172, 175, 176; 280/401, 403; 49/475, 477

[56] References Cited

U.S. PATENT DOCUMENTS

| 2,691,546 | 10/1954 | Torrance | 296/27 |
| 2,834,632 | 5/1958 | Mattox | 296/27 |
| 3,142,234 | 7/1964 | Maloon | 49/477 |
| 3,397,490 | 8/1968 | Carlson | 49/477 |

FOREIGN PATENT DOCUMENTS

| 117965 | 12/1943 | Australia | 296/171 |
| 966301 | 8/1957 | Fed. Rep. of Germany | 280/403 |
| 1195617 | 6/1965 | Fed. Rep. of Germany | 280/403 |
| 145820 | 6/1954 | Sweden | 296/171 |

Primary Examiner—Joseph F. Peters, Jr.
Assistant Examiner—Ross Weaver
Attorney, Agent, or Firm—Blair, Brown & Kreten

[57] ABSTRACT

A trailer unit arranged to be coupled to a vehicle including a frame supported on a single wheel with an enclosure on the frame having a floor provided with an opening in which is disposed a pan which may be vertically moved manually between an elevated travel position within the enclosure interior and a lower operative position exteriorly of the enclosure into supported engagement with the ground thereby providing headroom for an individual standing thereon within the enclosure interior together with seals on the frame which may be releasably urged into sealing engagement with the side walls of the pan and a passageway connected between the vehicle and the enclosure for passing therebetween by the individual.

14 Claims, 12 Drawing Figures

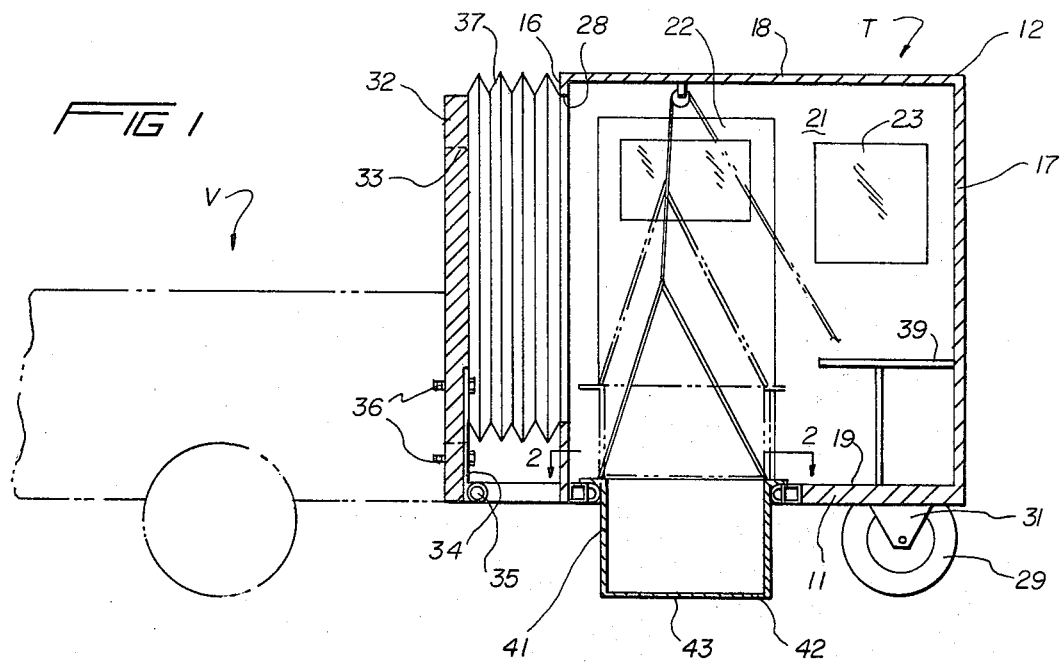
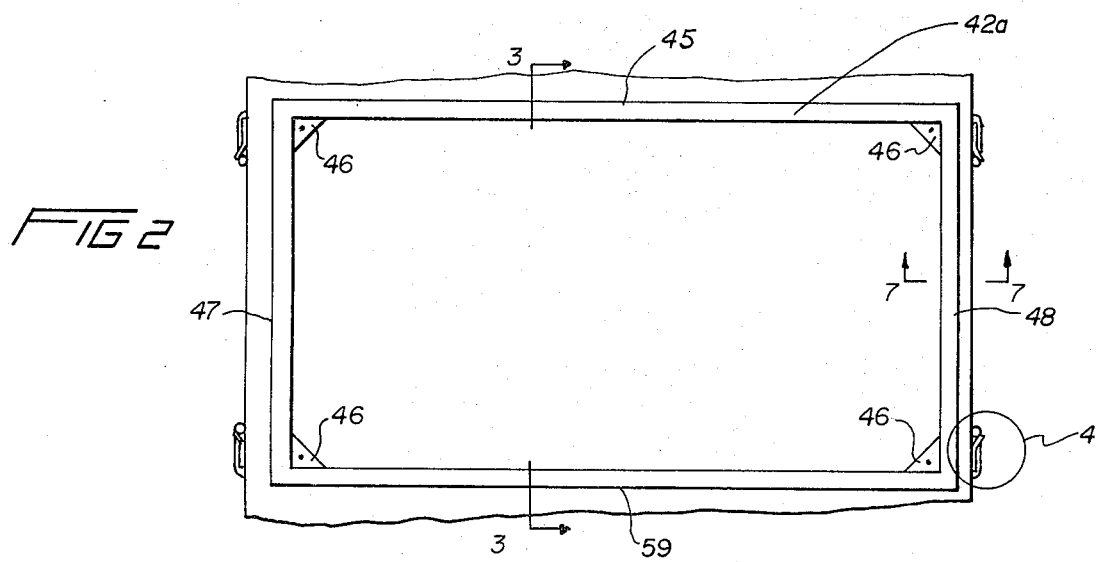
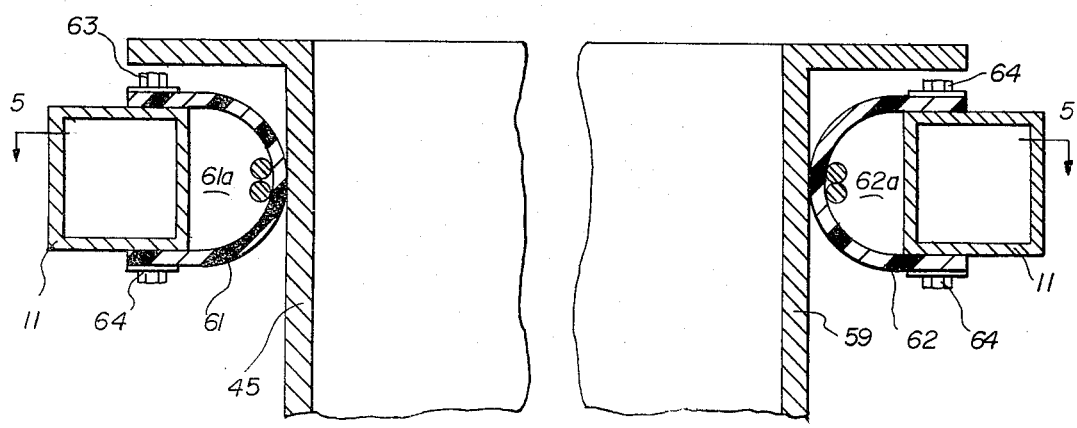

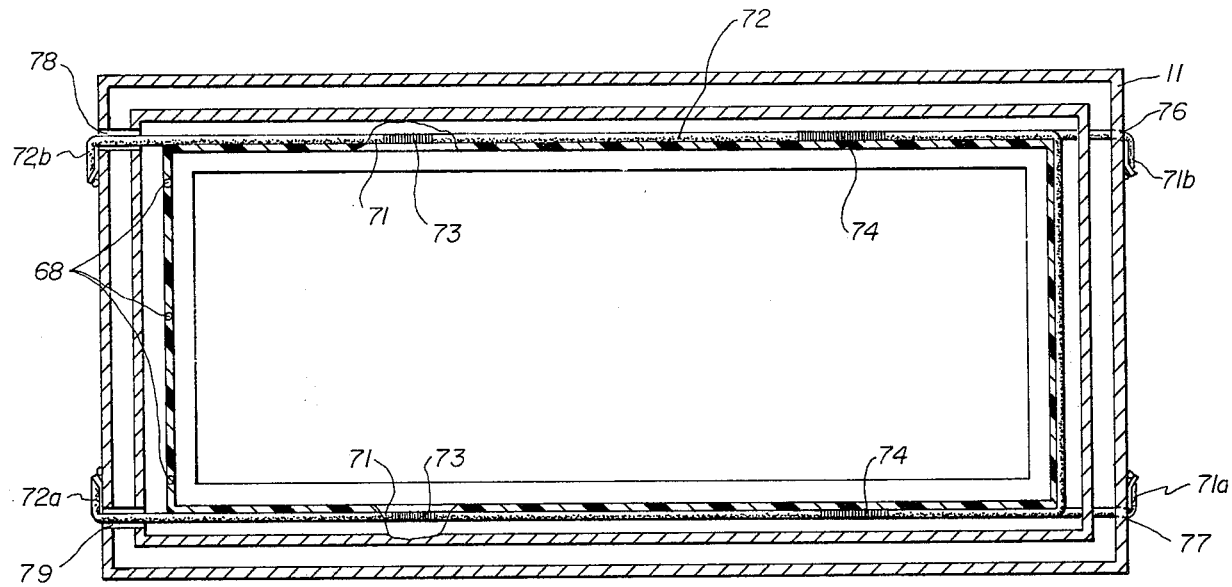
FIG 5
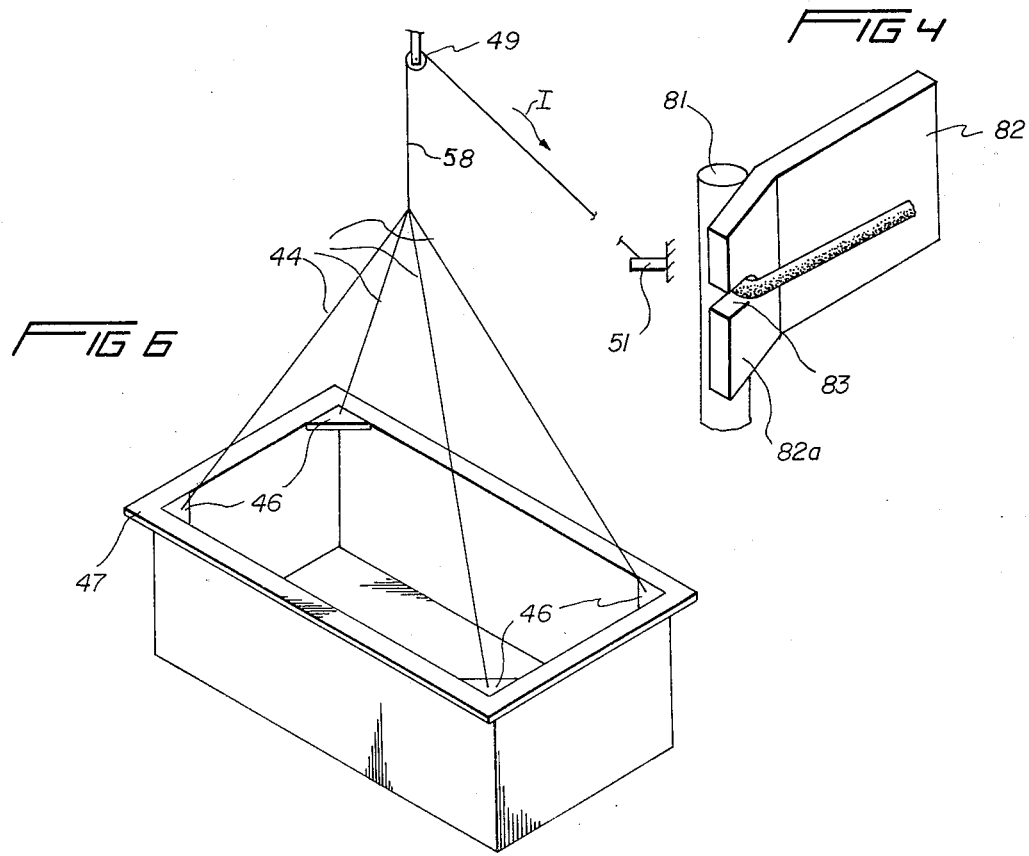
FIG 4
FIG 6

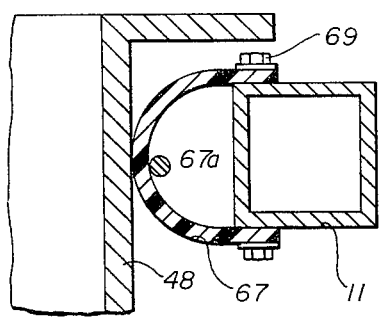
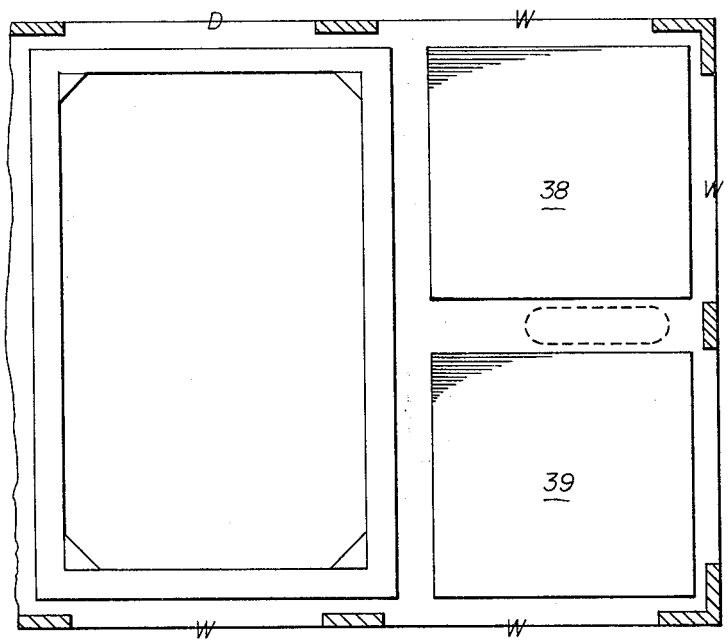
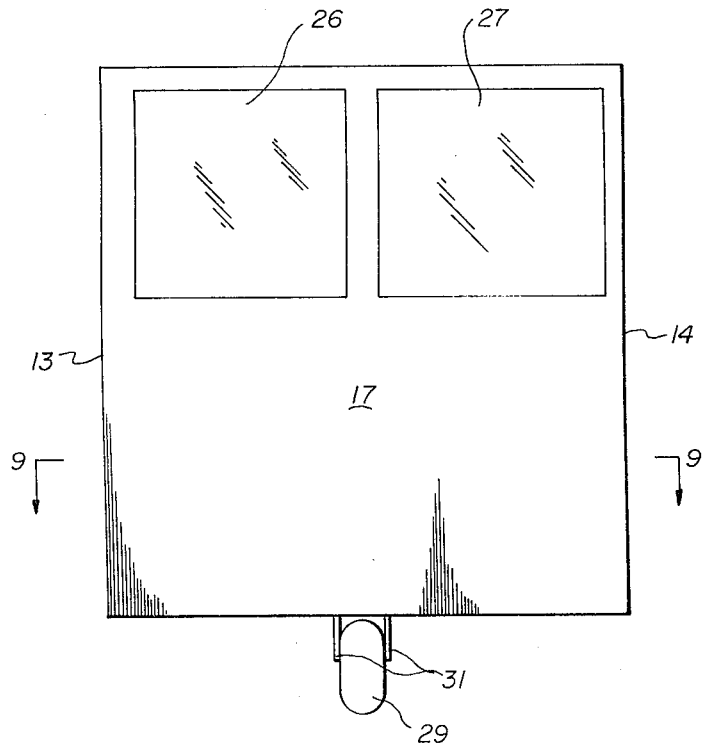

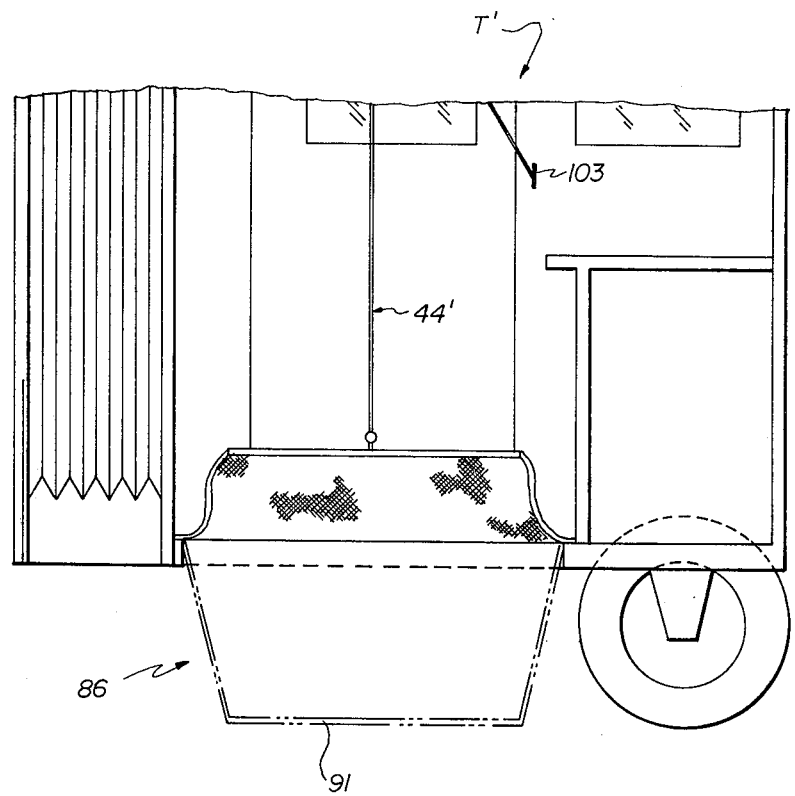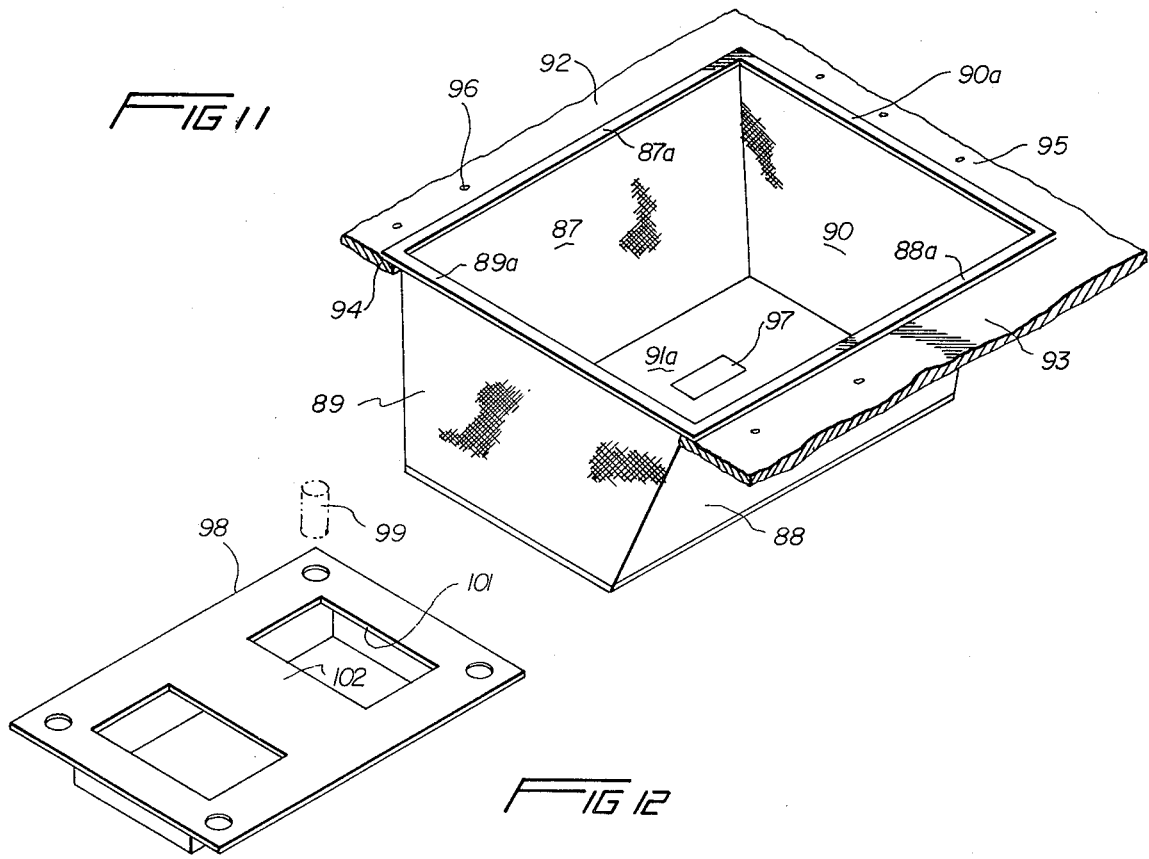

TRAILER UNIT

BACKGROUND OF THE INVENTION

With the interest today in camping, more and more emphasis has been placed on equipment which enhances the pleasure of camping activities by overcoming the primitive conditions common to such activities. Such efforts have produced elaborate facilities such as mobile homes or the like wherein all conveniences and living accommodations are provided. However, the initial cost and expensive maintenance of such elaborate facilities are prohibitive to many individuals who seek more simple and inexpensive equipment which at least minimizes the inconveniences of outdoor camping such as cooking, washing and the like. Therefore, it is not uncommon to find trailers which may be easily attached to a vehicle such as a pickup truck or the like, which are of modest construction, but which provide such facilities as sleeping quarters, appliances for cooking and other amenities which add considerably to the pleasures of outdoor camping. Nevertheless, even though such modest trailers are far less expensive than the more elaborately constructed trailers, they are characterized by a relatively high initial cost, high maintenance expenses, etc. which put such trailers beyond the economic reach of the typical wage earner.

OBJECTS AND SUMMARY OF THE INVENTION

Accordingly, a primary object of this invention is to provide a new and novel trailer unit for providing camping conveniences which is arranged to be coupled to a vehicle such as a pickup truck or the like.

Another object of this invention is to provide a new and novel trailer unit which is extremely simple and inexpensive in construction, which utilizes a minimum of parts and which may be easily attached to a towing vehicle while providing an enclosed access to the trailer unit from the towing vehicle.

A further object of this invention is to provide a new and novel trailer unit of low total overall height to minimize wind resistance and for improved gas mileage while at the same time may be expanded to provide adequate head room for an individual in a standing position within the unit.

A still further object of this invention is to provide a new and novel trailer unit using only a single wheel for ease in driving, backing and the like, which is of very light construction so as to eliminate the need for high capacity tires on the towing vehicle, which may be coupled and uncoupled from the towing vehicle in a simple and easy manner and which not only provides a kitchen containing a stove and counter but provides an easy passage between a camper shell on the towing vehicle and the trailer unit.

The objects of the invention and other related objects are accomplished by the provision of a frame having an enclosure thereon with means for detachably coupling the frame to a towing vehicle such as a pickup truck or the like and a single wheel on the frame for supporting the trailer unit for travel on the ground. The enclosure includes a floor, side walls and a roof defining an interior with the enclosure floor being provided with an opening in which platform means in the form of a pan are disposed for vertical movement between an elevated travel position within the enclosure interior and a lower operative position in supported engagement with the ground to provide a floor for accommodating an individual in a standing position on the frame which are urged by releasable urging means into sealing engagement with the side walls of the pan and means are provided within the enclosure interior for lifting the pan from the lower operative position into the elevated travel position.

Other objects and accomplishments of the invention will become apparent when viewed in the light of the following description taken in conjunction with the accompanying drawings.

BRIEF DESCRIPTION OF THE DRAWINGS

FIG. 1 is a longitudinal sectional view of the trailer of the invention connected to a towing vehicle such as a pickup truck shown diagrammatically in broken lines;

FIG. 2 is a sectional view taken substantially along lines 2—2 of FIG. 1 in the direction of the arrows;

FIG. 3 is a sectional view partially broken away taken substantially along lines 3—3 of FIG. 2 in the direction of the arrows;

FIG. 4 is an enlarged perspective view of the encircled portion of FIG. 2;

FIG. 5 is a sectional view taken substantially along lines 5—5 of FIG. 3 in the direction of the arrows;

FIG. 6 is a perspective view of a component part of the trailer of FIG. 1 together with a lifting mechanism incorporated in the invention;

FIG. 7 is a sectional view taken substantially along lines 7—7 of FIG. 2 in the direction of the arrows;

FIG. 8 is a rear view of the trailer unit of FIG. 1;

FIG. 9 is a sectional view taken substantially along lines 9—9 of FIG. 8 in the direction of the arrows.

FIG. 10 is a view similar to FIG. 1 showing a modification of the trailer of the invention;

FIG. 11 is a perspective view of a portion of the trailer of FIG. 10; and

FIG. 12 is a perspective view of a portion of the trailer portion of FIG. 11.

DESCRIPTION OF THE PREFERRED EMBODIMENT

Referring now to the drawings and to FIG. 1 in particular, there is shown a trailer unit constructed in accordance with the invention which is designated generally by the letter T. The trailer unit T is arranged to be coupled, as explained hereinafter, to a towing machine such as a pickup truck or the like shown diagrammatically in FIG. 1 and designated generally by the letter V.

The trailer unit T includes a frame 11 on which is mounted an enclosure 12 having a pair of side walls 13,14, front and rear walls 16,17, a roof 18 and floor 19 defining an interior 21. Preferably, in the illustrated embodiment, the side wall 14 is provided with a door 22 suitably hinged thereon and a side window 23. A pair of rear windows 26,27 are preferably provided in the rear wall 17, as shown best in FIG. 8, and the front wall 16 is provided with an access opening 28 for egress and ingress of at least one individual in the interior 21. of the enclosure 12.

In order to reduce the cost of construction and to limit the wind resistance of the trailer T, the enclosure 12 is of relatively low height so that an individual has sufficient headroom within the enclosure interior 21 between the floor 19 and roof 18 who may seek access to appliances or the devices such as a range and counter top 38,39 respectively suitably mounted within the enclosure interior 21 as shown best in FIG. 9.

Means are provided on the trailer unit T for supporting the trailer unit for travel on the ground which, in the illustrated embodiment, comprise a single wheel 29 suitably supported for rotation on a pair of brackets 31 mounted on the underside of the frame 11 as shown best in FIGS. 1, 8. Means are also provided on the trailer unit T for detachably coupling the frame 11 to the towing vehicle such as the pickup truck V. More specifically, a substantially rectangular yoke 32 having an opening 33 is attached to the frame 11 by means such as a plate 34. The plate 34 is preferably connected to the frame 11 through a hinge 35 to allow movement of the trailer unit T independent of the towing vehicle V. The yoke 32 may be attached to the rear end of the towing vehicle V by means such as bolts 36 which extend through the plate 34 and yoke 32.

In order to provide a passageway for an individual from the towing vehicle V, which may be provided with a camper shell of well known construction, into the interior 21 of the enclosure 12, a tubular housing 37 having open ends is suitably secured to the yoke 32 and enclosure front wall 16 with the open ends of the housing 37 in communication with the yoke opening 33 and the opening 28 in the housing front wall 16 respectively. In the preferred embodiment, the tubular housing 37 is of "accordion-like" construction thereby providing for some limited movement between the yoke 32 and enclosure 12 while providing an enclosed passageway for an individual moving between the vehicle V and the enclosure 12.

As specifically illustrative of the invention, the floor 19 of the enclosure 12 is provided with an opening 41 preferably of substantially rectangular configuration as shown in FIGS. 2, 9 which opening 41 extends transversely of the enclosure 12. Platform means are disposed within the opening 41 for vertical movement between an elevated travel position within the enclosure interior 21 as shown in broken lines in FIG. 1 and in a lower operative position as shown in solid lines in FIG. 1 for accommodating an individual in a standing position within the enclosure interior 21 for access to the range and counter top 38, 39 respectively.

In the illustrated embodiment, the platform means comprises a pan 42 of substantially rectangular configuration having a bottom wall 43, spaced-apart side walls 45, 59 and spaced-apart end walls 47,48, the pan also including a horizontally extending marginal flange 42a. In the lower operative solid line position of FIG. 1, the bottom wall 43 of the pan 42 is arranged to engage the ground when the trailer unit T is immobile so as to support the pan 43 on the ground. Thus, in the lower position of pan 42, an individual in the enclosure interior 21 may stand upright on the pan bottom wall 43 with adequate head room for access to the range and counter top 38,39 respectively within the enclosure interior 21. When the trailer unit T is to be moved, the pan 42 is moved into the enclosure interior 21, as shown by the broken lines in FIG. 1, so that the bottom wall 43 is disposed substantially in alignment with the floor 19 in a storage position.

Means are provided for lifting the pan 42 between the solid line operative position of FIG. 1 and the elevated broken line position of FIG. 1. More specifically and as shown best in FIGS. 1,6, a rope and pulley arrangement is provided for manually lifting the pan 42 which includes a plurality of ropes 44 the ends of which are suitably attached to gussets 46 secured, as shown in FIG. 6, to each of the four corners of the pan 42. The ropes 44 are attached to a single rope 58 which is passed over a pulley 49 suitably secured to the underside of the enclosure roof 18. Thus, the rope 58 may be pulled by an individual in the direction of the arrow I as shown in FIGS. 1,6 to elevate the pan 42 following which the free end of the rope 58 may be secured to a suitable cleat 51 or the like mounted on one of the walls of the enclosure 12.

Means are provided for sealing the side and end walls of the pan 42 within the opening 41. More specifically, as shown in FIG. 3, a pair of gaskets 61,62 of resilent material such as rubber or the like are secured in a U-shaped configuration to frame 11 by means such as bolts 63,64 adjacent the pan side wall 45,59 respectively, the gaskets 61,62 defining interior 61a, 62a respectively. Similarly, as shown in FIG. 7, gaskets 66,67 of resilient material are mounted in a U-shaped configuration to the frame 11 by means such as bolts 68,69 adjacent the end walls 47,48 of the pan 42.

Releasable means are provided for urging the gaskets 61,62 and 66,67 into sealing engagement with the side and end walls respectively of the pan 42. More specifically, a pair of elastic cords 71,72 are provided, as shown best in FIG. 5, elastic cord 71 having free ends 71a,71b and elastic cord 72 having free ends 72a,72b. Preferably, each of the cords 71,72 are of flexible braided material and include pairs of springs 73, 74 respectively. The elastic cord 71,72 are arranged to urge the gaskets 61,62 and 66,67 into sealing engagement with the side and end walls of the pan 42. As shown in FIGS. 3,5 and 7, elastic cord 71 is disposed within the interiors 61a,62a of the gaskets 61,62 respectively and the interior 66a of the gasket 66 adjacent the pan side walls 45,59 and one of the pan end walls 47 with the free end 71a,71b extending through suitable openings 76, 77 in the frame 11 as shown best in FIG. 5. The elastic cord 72 similarly extends through the interior 61a,61a of the gaskets 61,62 respectively and through the interior 67a of the other gasket 67 with the free ends 72a,72b extending through openings 78,79 in the frame 11 adjacent the other pan end wall 47.

In order to tension the cords 71,72 and therefore move the gaskets 61,62 and 66,67 into sealing engagement with the pan side and end walls, the cords ends 71a,71b and 72a,72b are each provided with a locking member such as a rod 81 suitably attached to the ends of the cords 71,72 as shown best in FIG. 4. The releasable means by which the cords 71,72 are tensioned includes a plate 82 having a notch 83 at one end thereof secured to the frame 11 adjacent each of the openings 76-79. Thus, when the chords 71,72 are to be tensioned, the ends of the chords 71,72 adjacent the rod 81 are inserted within the slot 83 in the plate 82 and the rod 81 positioned behind the slot for retaining engagement with the plate portion 82a as shown in FIG. 4.

Referring now FIGS. 10-12, there is shown a modification of the trailer unit of FIG. 1 wherein like numerals are used to identify like parts. As shown in FIG. 10, the trailer unit T' includes a pan designated generally by the numeral 86 provided with side and end walls 87, 88, and 89, 90 respectively which are formed of a flexible material such as canvas. The bottom wall 91 of the pan 86 is formed of a rigid material having a planar configuration such as plywood to which the lower edges of the side and end walls 87-90 are attached in any suitable manner. The side and end walls 87-90 of the pan 86 are provided with marginal edge portions 87a–90a which are secured to the trailer unit bottom wall 19 by means of strips 92–95 respectively of flat rigid material secured by means such as screws 96 to the floor 19 of the enclosure 12 with the flanges 87a–90a sandwiched therebetween.

The pan bottom wall 91 is provided with a recess 97 over which is positioned in overlying relationship a plate 98 secured to the upper surface 91a of the bottom 91 by means such as screws 99. The plate is provided with an opening 101 having a web 102 extending centrally thereover so that a rope and pulley means designated generally by the reference 44′ may be attached to one end. Thus, the rope and pulley means 44′ suitably secured at the opposite end to a bracket 103 on the inner wall of the enclosure 12 may be manually lifted from the broken line lower operative position into the solid line elevated travel position of FIG. 1 as described above with reference to the embodiment of FIGS. 1–9.

Having thus described the preferred embodiment of the invention it should be understood that numerous structural modifications and adaptations may be resorted to without departing from the spirit of the invention.

What is claimed is:

1. A trailer unit comprising, in combination:
a frame,
an enclosure on said frame for accommodating at least one individual,
means for detachably coupling said frame to a towing vehicle such as a truck or the like,
means on said frame for supporting said trailer unit for travel on the ground,
said enclosure having a floor, side walls and a roof defining an interior,
said enclosure floor having an opening,
platform means disposed in said opening for vertical movement between an elevated travel position within said enclosure and a lower position within said enclosure including sealing means on said frame for sealing engagement with said platform means, said sealing means comprises elongated tubular gaskets of resilient material on said frame within said floor opening adjacent said platform means and releasable means for urging said gaskets into sealing engagement with said platform means wherein said releasable urging means comprises elastic cords each having free ends, one of said elastic cords extending through one of said gaskets adjacent said platform means and means on said frame opposite said platform means for detachable engagement with said one elastic cord free ends to tension said one cord for urging said gaskets into sealing engagement with said platform means,
and means for lifting said platform means from said lower operative position into said elevated travel position.

2. A trailer unit in accordance with claim 1 wherein said platform means is arranged to engage the ground in said lower operative position.

3. A trailer unit in accordance with claim 2 wherein said platform means comprises a pan having a bottom wall, a pair of side walls and a pair of end walls, said side and end walls of said pan being arranged in closely spaced relationship with corresponding marginal edges of said floor opening.

4. A trailer unit in accordance with claim 1 wherein said enclosure includes an opening in one of said side walls adjacent said coupling means for access to said enclosure interior, a tubular housing having open ends, means for connecting one of said housing open ends to said enclosure in alignment with said enclosure opening and means for connecting the other open end of said housing to said vehicle to provide a passageway for at least one individual between said vehicle and said enclosure.

5. A trailer unit in accordance with claim 4 wherein said trailer unit supporting means comprises a single wheel and means for connecting said single wheel to the underside of said frame.

6. A trailer unit in accordance with claim 5 wherein said tubular housing includes a side wall of accordion-like construction.

7. A trailer unit in accordance with claim 3 wherein said pan is of rectangular cross-sectional shape having a pair of spaced-apart side walls extending transversely of said frame and a pair of spaced-apart end walls extending longitudinally of said frame and wherein said sealing means comprises a pair of elongated tubular gaskets of resilient material on said frame within said floor opening adjacent said transversely extending side walls and a pair of elongated tubular gaskets on said frame adjacent said longitudinally extending end walls and releasable means for urging said pairs of gaskets into sealing engagement with said pan side and end walls.

8. A trailer unit in accordance with claim 7 wherein said releasable urging means comprises a pair of elastic cords each having free ends, one of said elastic cords extending through said pair of gaskets adjacent said pair of pan side walls and one of said pair of gaskets adjacent one of said pan end walls and means on said frame opposite said one pan end wall for detachable engagement with said one elastic cord free ends to tension said one cord for urging said gaskets into sealing engagement with said pan side walls and said one end wall, the other of said elastic cords extending through said pair of gaskets adjacent said pair of pan side walls and the other of said pair of gaskets adjacent the other of said pan end walls for engagement with said other elastic cord free ends to tension said other cord for urging said gaskets into sealing engagement with said pan side walls and other end walls.

9. A trailer unit in accordance with claim 1 wherein said lifting means comprises rope and pulley means disposed within the interior of said enclosure and means for connecting said rope and pulley means to said pan for manually lifting said pan and for releasably retaining said pan in said elevated travel position.

10. A trailer unit in accordance with claim 3 wherein said pan side and end walls are formed of a flexible material and wherein said pan bottom wall is of planar configuration and is formed of rigid material.

11. A trailer unit in accordance with claim 10 wherein said pan side and end walls are formed of canvas and wherein said pan bottom wall is formed of plywood.

12. A trailer unit in accordance with claim 10 wherein said pan bottom wall is provided with a centrally located recess and wherein said means for lifting said platform means comprises a plate having an opening secured to the upper surface of said pan bottom wall in overlying relationship with said recess and a web member on said plate within said opening and rope and pulley means connected to said web for manually lifting said pan and for releasably retaining said pan in said elevated travel position.

13. A trailer unit in accordance with claim 1 wherein said elastic cords include a section having a spring so as to provide further resiliency.

14. A trailer united in accordance with claim 4 wherein said means for connecting said open end of said housing to said vehicle includes a yoke fastened to a rear of said vehicle, an opening on said yoke in registry with said housing open end, and a hinged plate connecting said yoke to frame, said hinged plate allowing movement of said trailer unit independent of said vehicle.

* * * * *